United States Patent Office 3,382,098
Patented May 7, 1968

---

3,382,098
WAX-POLYBUTADIENE COMPOSITION AND PAPERBOARD IMPREGNATED THEREWITH
Eugene M. Fauber, Hammond, Ind., and Hallard C. Moyer, Homewood, Ill., assignors to Sinclair Research, Inc., New York, N.Y., a corporation of Delaware
No Drawing. Filed June 15, 1964, Ser. No. 375,331
8 Claims. (Cl. 117—158)

---

ABSTRACT OF THE DISCLOSURE

Paperboard is impregnated with a novel composition consisting essentially of petroleum wax having a melting point in the range of about 115° to 200° F. and a minor amount of a wax-compatible polybutadiene oil having a molecular weight of from about 200 to 25,000. The resulting article of manufacture has been discovered to have significantly improved strength, rigidity and water resistance when thermally cured.

---

This invention relates to paperboard having improved strength and water-resistance properties and to a wax composition for impregnating the paperboard. More particularly the invention relates to boxes and cartons of corrugated paperboard impregnated with a novel wax composition and cured so as to provide the boxes and cartons with improved stacking strength and rigidity especially when such boxes come into direct contact with water.

The loss of strength which corrugated boxes exhibit on contact with water has restricted their utility or prevented their use for many types of service. A notable example is the shipment of fresh produce where the food must be sprayed with cold water or packed with ice. Another example is the shipment of frozen foods where the container must be able to withstand contact with water during temporary periods of exposure to thawing conditions. Another example is the handling, shipping, or storage of articles or materials when some exposure to weather is necessary.

Some progress has been made in improving the moisture resistance of corrugated paperboard. For example, it is well known to impregnate corrugated cartons with petroleum wax, or to impregnate the corrugated paper board with wax before the cartons are formed, or to carry out the impregnation coincident with the corrugating process. Such treatments have resulted in improved moisture resistance, particularly in such instances where the moisture is present as high humidity rather than as liquid water. In an effort to impart still better water resistance and strength retention, additives have been included in the wax. Polyethylenes and terpene resins have been used. U.S. Patent No. 2,967,116 to Hollinger et al. advocates inclusion of a hard, high melting thermoplastic polymer prepared from certain fractions derived from petroleum.

Unfortunately, the various wax compositions and methods of application have not afforded the degree of rigidity and stacking strength desired where the box or carton has substantial contact with liquid water. Consequently, in spite of the many desirable features of the corrugated box as a shipping and storage container, the wax-impregnated corrugated box has gained only limited acceptance in those areas of use where actual contact with water or other aqueous media is involved.

It has now been found that a paperboard base impregnated with a wax composition consisting essentially of a petroleum wax and a minor amount of a polybutadiene oil provides, when thermally cured, a paperboard product significantly improved in strength, rigidity and water resistance.

The petroleum wax of the composition of the invention is the major component of the impregnant constituting about 70 to 95% by weight of the total composition. The wax can be a petroleum wax having a melting point in the range of about 115 to 200° F., preferably about 125 to 185° F., and preferably having a 100 gram needle penetration at 77° F. of about 25 or 50 maximum.

Suitable petroleum waxes may include crude waxes such as slack wax and petrolatum as well as the more refined paraffin waxes, microcrystalline waxes including tank bottom microcrystalline waxes, etc. The methods by which the waxes are obtained from petroleum are well known by virtue of many publications and will not be described in detail here. Ordinarily, the paraffin waxes can be removed from middle and heavy distillate portions of petroleum by some type of low temperature separation usually called solvent dewaxing. Microcrystalline waxes can be obtained by the solvent deoiling of petrolatum and tank bottom waxes, the latter being the wax precipitates that settle out of crude oil storage tanks. The most preferred petroleum waxes are the n-paraffinic waxes having a melting point of about 125 to 155° F. and a 100 gram needle penetration at 77° F. of about 15 maximum. If desired, blends of petroleum waxes can be employed as long as the final blend conforms to the melting point range designated above.

The polybutadiene oils of the invention which constitute the minor component of the wax composition, are polymers of butadiene which can contain up to about 40%, preferably up to about 25% of a comonomer such as styrene, acrylic and methacrylic acids or their esters, maleic esters or anhydrides, and the like. Often the comonomer is monovinyl, alpha-olefin bond-containing compound, preferably of about 2–10 carbon atoms. The polybutadiene oils are wax-compatible viscous liquids having a Staudinger molecular weight of about 200 to 25,000, preferably about 1,500 to 10,000, and can be prepared by the polymerization of polybutadiene alone or polybutadiene in admixture with the aforementioned minor amounts of comonomer by known procedures utilizing conventional polybutadiene catalysts, such as alkali metal, free radical-initiating Friedel-Crafts type polymerization catalysts.

Polybutadiene oils suitable for use in the present invention can also be prepared by the controlled polymerization of butadiene monomer in a homogeneous system of aqueous hydrogen peroxide, the butadiene monomer and a mutual solvent-diluent. According to this process an appropriate amount of aqueous hydrogen peroxide can be combined with an appropriate amount of a mutual solvent-diluent and then this combination can be added to the butadiene monomer to form a homogeneous solution. Polymerization is initiated by heating the solution at elevated temperatures, e.g. above 100° C., and especially about 115 to 200° C. and the polymerization is controlled to maintain the polymerization at desired temperatures to obtain in say 3 to 4 hours a conversion of from about 40% to about 60% of the monomer to polymer. Suitable mutual solvent-diluents for the aqueous hydrogen peroxide and butadiene are alcohols, ketones, ethers, alcohol-ketones, alcohol-ethers, and alcohol-esters which are miscible in water in all proportions and which do not contain polymerizable carbon-to-carbon unsaturation.

Polybutadiene oils prepared by the aqueous $H_2O_2$ route may have a hydroxyl value in milliequivalents per gram of about 0.1 to 5, preferably about 0.3 to 1.5. They may also often have a viscosity at 30° C. of about 5 to 20,000 poises, preferably about 25 to 5000 poises and often possess an average molecular weight by cyroscopic, ebullioscopic or osmometric methods in the range of about 400 to 25,000. The amount of polybutadiene oil added to the petroleum wax will vary depending on the particular wax used, its hardness, etc. but ordinarily will be in the range of about 5 to 30% by weight.

The base sheet material impregnated with the wax composition of the invention can be any suitable paperboard but is preferably corrugated paperboard. In perhaps its most practical aspect the corrugated paperboard can be impregnated in the form of a blank which will ultimately be erected into a box. Ordinarily corrugated paperboard is composed of a crimped medium having flat liners adhered to the crests of the crimped or corrugated medium.

Although unnecessary it is of advantage to include in the polybutadiene oil a metallic drier. It has been found that the use of small amounts of the heavy metal naphthenates or heavy metal salts of essentially olefinic, aliphatic, including cycloaliphatic, acids of 6 to 20 carbon atoms assist in reducing the curing time and/or permit the use of lower curing temperatures. By heavy metal is meant a metal having an atomic number of 20 to 82 and includes, for instance, lead, cobalt, iron, nickel, manganese, tin, cadmium, chromium, zinc, copper, vanadium and the like. Preferred among the olefinic acids are naphthenic acid and tall oil which is essentially composed of unsaturated acids of 18 to 20 carbons. If employed the heavy metal drier is usually provided in amounts on the order of about .003 to .06%, preferably about 0.004 to 0.04%, by metal content weight based on the total impregnant. The drier per se can be added to the impregnant but is preferably added as a concentrate in a light hydrocarbon distillate such as kerosene.

The wax blend of the invention can be applied by immersing the box or box blank in a bath of the blend in a molten state to substantially saturate the paperboard, then removing and allowing the excess to drain off the box or box blank. Optimum bath temperature, immersion time, and necessary drain time will, of course, depend on size and shape of the article being impregnated. A temperature of about 200–250° F. is generally suitable as is an immersion time of about 10–20 seconds. While immersion is the preferred method of application, the blend can, if desired, be applied by spraying or roll application. These methods can be advantageous for application to, for instance, large, flat sheets of paperboard. In spray or roll application a predetermined amount of wax blend may be applied to the exteriors and the temperature of the paperboard maintained at more than about 190° F. until the material is absorbed. Whatever the method of application, for maximum water resistance the paperboard should be fully saturated. This typically requires at least about 25%, usually about 30% of impregnant, based on the weight of the impregnated paperboard. Ordinarily the amount of impregnant does not exceed about 50% of the weight of the board, but it may if desired.

After impregnation the paperboard is thermally cured by subjecting it to an elevated temperature, often of at least about 300° F. but below the degradation temperature of the paperboard, preferably at least about 350° F., in the presence of a molecular oxygen-containing gas such as air. The curing is conventionally carried out in a forced-draft air oven or its equivalent. The curing time may be dependent upon the curing temperature selected. For example, in the absence of the heavy metal drier, a temperature of about 300° F. for about 2 to 5 hours may be required while at a temperature of about 350° F. about ½ to 1 hour may be sufficient. As aforementioned, use of the heavy metal driers of the invention will substantially reduce the curing time and may also lower the curing temperature to be selected. Whether the heavy metal drier is used or not, care should be taken in the selection of the curing temperature and time period since an excessively long cure period may be detrimental to the desired result.

If desired, minor amounts of other resinous materials known to improve the wet and dry strength of paperboard can be blended with the impregnant of the invention and the resulting blend employed as the impregnant. Suitable components are, for example, hydrocarbon polymer resins having an ASTM ring and ball softening point of above about 150° F., for instance, up to about 275° F. Particularly preferred are hydrocarbon polymer resins having as a repeating unit an aliphatic monocyclic terpene radical and a softening point as described above. Examples of the latter resins are polyterpene resins (Piccolyte Resins) which can be made by the acid catalyst polymerization of $\beta$-pinene. If employed, about 5 to 35%, preferably about 10 to 25% by weight based on the blend, of the additional polyterpene resin is often blended with about 65 to 95%, preferably 75 to 90% by weight of the petroleum wax-polybutadiene oil blend of this invention Blending of the two components can be easily effected by heating at an elevated temperature, such as about 180 to 250° F. or more.

The following examples are included to further illustrate the present invention.

Example I

Several wax blends were formulated, each containing a paraffin wax having a melting point of 143° F. and a 100 gram needle penetration at 77° F. of approximately 12 maximum, and 20% of one of the polybutadiene oils A, B or C or a hard thermoplastic resin D all identified in the table below. Each of the samples was evaluated as an impregnant for corrugated paperboard. A sample composed of 100% paraffin wax was also tested for comparison.

Corrugated paperboard specimens were prepared as follows:

Four inch by 6 inch panels of corrugated boards (long edge parallel to flutes) were immersed into a molten bath of the wax composition to be evaluated for approximately 20 seconds. The corrugated board panels were removed from the bath, allowed to drain at room temperature to remove excess wax composition and then thermally cured by placing them in a forced-draft air oven maintained under the temperatures indicated in the table and for the curing periods also shown in the table. After the curing the impregnated paperboards were allowed to cool to room temperature.

The crush strength, both wet and dry, of the corrugated paperboard specimens impregnated with the wax composition were determined on an Instron tester equipped with a device for crushing a specimen between steel plates. The steel plates were mounted in a steel cage to prevent any sliding movement when the load was applied and to therefor minimize shear. The wet test was conducted after soaking the impregnated paperboard specimens in water. The water soaking was conducted by completely submerging the specimens with the flutes in a vertical position to insure continuous water contact on the internal and external surfaces. The original paperboard before impregnation was conditioned at 50% relative humidity at 75° F. The results of the tests are shown in Table I below and are given as the average load in pounds required to crush a specimen.

TABLE I

[Flat crush strength, crushing load, pounds, 4 x 6" specimens]

| | Impregnant, Weight Percent of Treated Board | Uncured | | Cured 2 hrs. at 350° F. | | Cured 1 hr. at 350° F. | | Cured ½ hr. at 350° F. | |
|---|---|---|---|---|---|---|---|---|---|
| | | Unsoaked | 30 min. Water Soak | Unsoaked | 30 min. Water Soak | Unsoaked | 30 min. Water Soak | Unsoaked | 30 min. Water Soak |
| 100% 143 M.P. Paraffin Wax | 30 | 1,100 | 250 | | | | | | |
| 80% Wax plus 20% Polymer A | 32 | | | 990 | 600 | 1,400 | 750 | 1,400 | 500 |
| 80% Wax plus 20% Polymer B | 32 | | | 1,600 | 650 | 1,400 | 950 | | |
| 80% Wax plus 20% Polymer C | 32 | | | | | 1,400 | 550 | 1,350 | 550 |
| 80% Wax plus 20% Polymer D | 32 | 1,350 | 330 | | | | | | |
| No Impregnant | 0 | 600 | <10 | | | | | | |

Polymer A—a butadiene homopolymer of about 3000 mol. wt.
Polymer B—an approximate 75% terpolymer of butadiene, styrene, and methacrylic acid of about 4,000 mo. wt./25% xylene and isopropanol mixture.
Polymer C—a butadiene homopolymer of about 2,000 mol. wt.
Polymer D—a hard, thermoplastic petroleum resin of the type disclosed in Canadian Patent 531,202 to Ward.

The data of Table I demonstrate the improvement in strength resulting from the use of the wax composition of the present invention. As shown, the paperboard without any impregnant suffers total loss of strength after a 30 minute water soak. Use of a hard 143° F. melting point paraffin wax alone provides considerable improvement but the wet crush strength is substantially less than the dry crush strength of the original board. Use of thermoplastic resin D provided some improvement in wet strength but polymer A, B or C of the invention provided crush strengths approaching or exceeding the dry crush strength of the original board.

Example II

The wet crush strength of corrugated paperboard specimens impregnated with the 80% wax plus 20% polymer A composition of Example I with and without 0.4% cobalt naphthenate solution (6% Co) was determined as in Example I after curing for 20 minutes and 45 minutes at both 300° F. and 370° F. A specimen impregnated with 100% of the wax of Example I was also tested for comparison. The results are shown in Table II below.

TABLE II

[Crush strength after oven cure at designated temperature and time, followed by 30 min. soak in water at 75° F.]

| | Flat Crush, lbs. 300° F. | | 4 x 6" Specimen 370° F. | |
|---|---|---|---|---|
| | 20 min. | 45 min. | 20 min. | 45 min. |
| 100% 143 M.P. Wax | 208 | | | |
| 80% Wax plus 20% Polymer A | *133 | 188 | 570 | 672 |
| 80% Wax plus 20% Polymer A plus .4% Cobalt Naphthenate Solution (6% Co) | 433 | 582 | 600 | 766 |

*At 20% polymer level, uncured specimens have lower crush strength than straight wax.

The data of Table II together with the data of Table I demonstrate the advantageous reduction of curing time provided the wax-polymer compositions by the use of a small amount of cobalt naphthenate.

Example III

A similar reduction in curing time can be obtained by substituting the cobalt salt of tall oil for the cobalt naphthenate in Example II.

It is claimed:
1. An article of manufacture consisting essentially of a corrugated paperboard base impregnated with a wax composition consisting essentially of about 70 to 95% by weight of a petroleum wax having a melting point in the range of about 115 to 200° F. and about 5 to 30% by weight of a wax-compatible polybutadiene oil having a Staudinger molecular weight of from about 200 to 25,000.

2. The article of manufacture of claim 1 which has been thermally cured by heating at a temperature of at least about 300° F. in the presence of a molecular oxygen-containing gas.

3. The article of manufacture of claim 1 wherein the petroleum wax is a paraffin wax having a melting point of about 125 to 185° F. and a 100 gram needle penetration at 77° F. of about 15 maximum.

4. The article of manufacture of claim 3 which has been thermally cured by heating at a temperature of at least about 300° F. in the presence of a molecular oxygen-containing gas.

5. The article of manufacture of claim 4 wherein the wax composition is at least about 25% of the total weight of the impregnated paperboard base.

6. A wax composition consisting essentially of about 70 to 95% by weight of a petroleum wax having a melting point in the range of about 115 to 200° F. and about 5 to 30% by weight of a wax-compatible polybutadiene oil having a Staudinger molecular weight of about 200 to 25,000.

7. The composition of claim 6 wherein the petroleum wax is a paraffin wax having a melting point of about 125° to 185° F. and a 100 gram needle penetration at 77° F. of about 15 maximum.

8. The composition of claim 6 wherein the wax has a maximum penetration at 77° F. of about 25.

References Cited

UNITED STATES PATENTS

| | | | |
|---|---|---|---|
| 2,705,205 | 3/1955 | Sullivan | 117—158 X |
| 2,773,780 | 12/1956 | Koenecke et al. | 117—132 |
| 2,777,890 | 1/1957 | Ikeda | 117—132 |
| 2,842,455 | 7/1958 | Young et al. | 106—271 |
| 2,872,345 | 2/1959 | Slotterbeck et al. | 117—167 X |
| 2,967,116 | 1/1961 | Hollinger et al. | 117—158 |
| 3,052,569 | 9/1962 | McNamara | 117—158 X |

WILLIAM D. MARTIN, *Primary Examiner.*

M. LUSIGNAN, *Assistant Examiner.*